United States Patent
Leidner et al.

[11] Patent Number: 6,011,084
[45] Date of Patent: Jan. 4, 2000

[54] ERASABLE COLORED PENCIL LEAD

[75] Inventors: Jacob Leidner; David Hacker, both of Toronto, Canada

[73] Assignee: Binney & Smith Inc., Easton, Pa.

[21] Appl. No.: 09/105,704

[22] Filed: Jun. 26, 1998

[51] Int. Cl.[7] ............................ C09D 13/00; C08L 27/18; C08K 7/02

[52] U.S. Cl. ............................ 523/164; 524/520; 524/546

[58] Field of Search .................................. 523/160, 161, 523/164; 106/31.11, 31.12

[56] References Cited

U.S. PATENT DOCUMENTS

| | | |
|---|---|---|
| 257,706 | 5/1882 | Horne . |
| 328,366 | 10/1885 | Walpuski . |
| 471,438 | 3/1892 | Schwarwald . |
| 566,845 | 9/1896 | Cross . |
| 1,502,763 | 7/1924 | Bugbee . |
| 2,220,992 | 11/1940 | Chesler . |
| 2,280,988 | 4/1942 | Weiser . |
| 2,338,176 | 1/1944 | Goepfert . |
| 3,821,157 | 6/1974 | Muller et al. . |
| 3,834,910 | 9/1974 | Mukai et al. . |
| 3,843,570 | 10/1974 | Murayama . |
| 3,849,394 | 11/1974 | Roueche et al. . |
| 3,976,488 | 8/1976 | Nihyakumen et al. . |
| 4,017,451 | 4/1977 | Ishida et al. . |
| 4,030,934 | 6/1977 | Iijima . |
| 4,209,332 | 6/1980 | Tsujio . |
| 4,298,507 | 11/1981 | Leon . |
| 4,548,960 | 10/1985 | Bentley . |
| 4,647,602 | 3/1987 | Wilczak et al. . |
| 4,668,572 | 5/1987 | Iizuka et al. . |
| 4,853,167 | 8/1989 | Bard et al. . |
| 4,938,952 | 7/1990 | Kamen et al. . |
| 4,978,390 | 12/1990 | Snedeker . |
| 5,066,486 | 11/1991 | Kamen et al. . |
| 5,093,110 | 3/1992 | Kamen et al. . |
| 5,158,606 | 10/1992 | Carlick et al. . |
| 5,240,110 | 8/1993 | Reichenbach et al. . |
| 5,318,622 | 6/1994 | Kitazawa et al. . |
| 5,322,220 | 6/1994 | Rehkemper . |
| 5,336,307 | 8/1994 | Horvat et al. . |
| 5,345,254 | 9/1994 | Wong et al. . |
| 5,346,540 | 9/1994 | Schlennert . |
| 5,407,472 | 4/1995 | Yamamoto . |
| 5,416,156 | 5/1995 | Kamen . |
| 5,417,746 | 5/1995 | Cheng . |
| 5,464,470 | 11/1995 | Brachman et al. . |
| 5,531,947 | 7/1996 | Metzger et al. . |
| 5,567,206 | 10/1996 | Jankewitz et al. . |
| 5,591,787 | 1/1997 | Schlennert et al. . |
| 5,591,796 | 1/1997 | Wisniewski et al. . |
| 5,595,589 | 1/1997 | Hoshiba et al. . |
| 5,595,700 | 1/1997 | Kitazawa . |
| 5,645,629 | 7/1997 | Kitazawa et al. . |
| 5,716,434 | 2/1998 | Koyama . |

FOREIGN PATENT DOCUMENTS

| | | |
|---|---|---|
| 9710122 | 7/1997 | Australia . |
| 8705426 | 4/1989 | Brazil . |
| 55226 | 6/1982 | European Pat. Off. . |
| 88318 | 9/1983 | European Pat. Off. . |
| 505262 | 9/1992 | European Pat. Off. . |
| 555673 | 8/1993 | European Pat. Off. . |
| 573000 | 12/1993 | European Pat. Off. . |
| 756946 | 2/1997 | European Pat. Off. . |
| 2049429 | 6/1969 | France . |
| 1933793 | 1/1971 | Germany . |
| 2419115 | 10/1975 | Germany . |
| 2447431 | 4/1976 | Germany . |
| 2555564 | 9/1976 | Germany . |
| 2527416 | 12/1976 | Germany . |
| 2603304 | 8/1977 | Germany . |
| 2611608 | 9/1977 | Germany . |
| 2724317 | 12/1978 | Germany . |
| 2728705 | 1/1979 | Germany . |
| 27929320 | 1/1979 | Germany . |
| 2812424 | 9/1979 | Germany . |
| 2815695 | 10/1979 | Germany . |
| 2819134 | 11/1979 | Germany . |
| 2822134 | 11/1979 | Germany . |
| 2826350 | 12/1979 | Germany . |
| 2848952 | 5/1980 | Germany . |
| 2850559 | 5/1980 | Germany . |
| 2906101 | 8/1980 | Germany . |
| 2929938 | 2/1981 | Germany . |
| 2932276 | 2/1981 | Germany . |
| 3030947 | 2/1982 | Germany . |
| 3042283 | 6/1982 | Germany . |
| 3046093 | 7/1982 | Germany . |
| 3125441 | 1/1983 | Germany . |
| 3237546 | 4/1984 | Germany . |
| 3237557 | 4/1984 | Germany . |
| 3301546 | 7/1984 | Germany . |
| 3317381 | 2/1985 | Germany . |
| 3323688 | 3/1985 | Germany . |
| 3401647 | 1/1986 | Germany . |
| 3421408 | 1/1986 | Germany . |
| 3527778 | 2/1987 | Germany . |
| 3538015 | 4/1987 | Germany . |
| 3600370 | 7/1987 | Germany . |
| 3642950 | 7/1987 | Germany . |
| 3727877 | 3/1989 | Germany . |
| 3835679 | 4/1990 | Germany . |
| 3840760 | 6/1990 | Germany . |
| 4102217 | 7/1992 | Germany . |
| 4200405 | 10/1993 | Germany . |
| 4237063 | 5/1994 | Germany . |
| 3837473 | 5/1995 | Germany . |
| 19502779 | 10/1995 | Germany . |
| 53-000725 | 1/1978 | Japan . |
| 53-004631 | 1/1978 | Japan . |
| 53-074921 | 7/1978 | Japan . |
| 53-074922 | 7/1978 | Japan . |
| 79023612 | 8/1979 | Japan . |
| 54-148623 | 11/1979 | Japan . |
| 55-025368 | 2/1980 | Japan . |
| 55-029521 | 3/1980 | Japan . |
| 55-115479 | 9/1980 | Japan . |
| 55-127473 | 10/1980 | Japan . |
| 55-127474 | 10/1980 | Japan . |
| 55-127475 | 10/1980 | Japan . |
| 55-127476 | 10/1980 | Japan . |
| 56-13733 | 3/1981 | Japan . |
| 55-3192 | 8/1981 | Japan . |
| 56-109266 | 8/1981 | Japan . |
| 56-163171 | 12/1981 | Japan . |
| 56-163172 | 12/1981 | Japan . |
| 57-083570 | 5/1982 | Japan . |
| 58-002369 | 1/1983 | Japan . |
| 58-080369 | 5/1983 | Japan . |
| 58-113274 | 7/1983 | Japan . |
| 58-117266 | 7/1983 | Japan . |
| 59-117569 | 7/1984 | Japan . |

| | | |
|---|---|---|
| 59-117570 | 7/1984 | Japan . |
| 59-120668 | 7/1984 | Japan . |
| 60-004097 | 1/1985 | Japan . |
| 60-118772 | 6/1985 | Japan . |
| 61-023667 | 2/1986 | Japan . |
| 61-175093 | 8/1986 | Japan . |
| 61-252278 | 11/1986 | Japan . |
| 61-275370 | 12/1986 | Japan . |
| 61-293275 | 12/1986 | Japan . |
| 62-027480 | 2/1987 | Japan . |
| 62-027481 | 2/1987 | Japan . |
| 62-064876 | 3/1987 | Japan . |
| 87025195 | 6/1987 | Japan . |
| 87034559 | 7/1987 | Japan . |
| 62-177081 | 8/1987 | Japan . |
| 88001199 | 1/1988 | Japan . |
| 63-057682 | 3/1988 | Japan . |
| 63-081180 | 4/1988 | Japan . |
| 63-189481 | 8/1988 | Japan . |
| 89002154 | 1/1989 | Japan . |
| 2038475 | 2/1990 | Japan . |
| 2060978 | 3/1990 | Japan . |
| 3106976 | 5/1991 | Japan . |
| 3139579 | 6/1991 | Japan . |
| 3153778 | 7/1991 | Japan . |
| 3153779 | 7/1991 | Japan . |
| 4164978 | 6/1992 | Japan . |
| 4236276 | 8/1992 | Japan . |
| 5039449 | 2/1993 | Japan . |
| 5230414 | 9/1993 | Japan . |
| 05148445 | 11/1993 | Japan . |
| 6136315 | 5/1994 | Japan . |
| 6192613 | 7/1994 | Japan . |
| 639909 | 12/1978 | U.S.S.R. . |
| 975765 | 11/1982 | U.S.S.R. . |
| 235 | 1/1855 | United Kingdom . |
| 5005 | 5/1892 | United Kingdom . |
| 11182 | 6/1902 | United Kingdom . |
| 2001011A | 1/1979 | United Kingdom . |

*Primary Examiner*—Vasu Jagannathan
*Assistant Examiner*—Callie E. Shosho
*Attorney, Agent, or Firm*—Leydig, Voit & Mayer, Ltd.

[57] ABSTRACT

The present invention provides a colored pencil lead composition comprising a colorant, one or more binder resins, a fibrillatable or fibrillated material, a non-fibrillatable particulate lubricant, and a filler. An example of a suitable binder resin is high density polyethylene, and an example of a fibrillated or fibrillatable material is fibrillatable polytetrafluoroethylene. An example of a non-fibrillatable particulate lubricant is micronized polytetrafluoroethylene. The colored pencil lead of the present invention produces marks on paper which are easily erased by ordinary pencil eraser. The present invention further provides a process for preparing the colored pencil lead of the present invention comprising compounding the colorant, the binder resin or resins, the fibrillatable or fibrillated material, the non-fibrillatable particulate lubricant, and the filler to obtain a blend and forming the pencil lead from the blend.

23 Claims, No Drawings

ERASABLE COLORED PENCIL LEAD

FIELD OF THE INVENTION

The present invention relates generally to colored pencil lead compositions, and in particular to erasable colored pencil lead compositions and a method of preparing such compositions.

BACKGROUND OF THE INVENTION

Although colored lead pencils have provided enjoyment to children and others for a long time, attempts have been made to improve upon the properties of these pencils. The properties that make coloring a pleasant and rewarding experience include smooth laydown of the lead composition, good color intensity of the markings, good break strength, and sufficient lead bending strength. In addition, it is desirable to have colored lead pencils that can produce markings on paper that do not smear easily and that are erasable by ordinary pencil erasers.

Common colored pencil leads are made from a blend of a pigment, a binder resin and a filler. Although these colored leads possess excellent writing qualities, their markings cannot be easily erased by ordinary pencil eraser. Attempts have been made to improve the lead properties, particularly the erasability of the markings. For example, attempts have been made to improve erasability by reducing the pigment content of pencil leads; although this approach reduces the color contrast between the erased mark and the paper, the color intensity of the original mark has been unsatisfactory.

In another approach to improve erasability of the markings, colored pencil leads have been made by blending a mixture of a pigment, one or more fillers, and a wax. Although this approach has improved the erasability of the marking, complete removal of the marking has not been achieved with the result that the erased region is left with a smeared appearance. It has been found that the wax tends to adhere rather tenaciously to the fibers of the paper and to penetrate the spaces between the paper fibers, and when the markings are rubbed, they tend to smudge, smear, and/or leave a residue.

Attempts have been made to prepare colored lead pencils to eliminate the smearing or residue. For example, the amount of wax has been reduced. Unfortunately, this approach makes the lead very hard and the lead does not write well.

In yet another approach, the use of a low melting wax, fat, or oil has been attempted. Colored pencil leads have been made by blending a pigment, a binder resin, a filler, and a low melting wax, fat, or oil. This approach, although it improves the erasability of the markings, is not easily practicable in commerce because either it increases the manufacturing cost or it affects certain other qualities of the lead. For example, if the lead is produced in a wet lead forming process, the wet lead should be dried at a temperature that is lower than the melting temperature of the wax, fat or oil. This increases the lead dry time, and consequently, reduces manufacturing productivity. The low melting wax, fat or oil also tends to seep or migrate out of the lead. This could lead to loss of strength as well as failure to produce an appropriate color strength. Further, the low melting wax, fat or oil also tends to bleed through the paper, thereby further affecting the quality of the coloring. To alleviate some of the drawbacks associated with the use of a low melting wax, fat, or oil, complex manufacturing processes have been proposed which unfortunately can increase the pencil manufacturing cost. Thus, there exists a need for a colored pencil lead having improved erasability. There further exists a need for colored pencil leads which do not smear when erased by an ordinary pencil eraser. There further exists a need for colored pencil leads which do not smudge when rubbed with a finger, blending stump, or other objects. There further exists a need for a colored pencil lead that has smooth laydown, good color strength, adequate bending strength, and adequate break strength.

These and other objects and advantages of the present invention, as well as additional inventive features, will be apparent from the description of the invention provided herein.

SUMMARY OF THE INVENTION

The foregoing needs have been fulfilled to a great extent by the present invention which provides a colored pencil lead composition comprising a colorant, one or more binder resins, a fibrillatable or fibrillated material, a non-fibrillatable particulate lubricant, and a filler. The colored pencil lead of the present invention is free or substantially free of wax or derivatives of wax or other materials that resist removal from paper fibers.

The present invention further provides a process for preparing the colored pencil lead composition of the present invention comprising compounding the colorant, the binder resin or resins, the fibrillatable or fibrillated material, the non-fibrillatable particulate lubricant, and the filler to obtain a blend and forming the pencil lead from the blend.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE EMBODIMENTS

The present invention relates to a colored pencil lead having improved erasability and reduced smudging and smearing. The composition comprises a fibrillatable or fibrillated material and a non-fibrillatable particulate lubricant. The markings made by the lead are easily erasable using an ordinary pencil eraser without leaving a substantial residue or a smear, and the markings are substantially smudge free when rubbed with other objects it comes in contact with. The colored pencil lead of the present invention provides improved erasability without sacrificing other desirable properties such as smooth laydown, good color strength, reduced tip fraying, and breaking strength. The lead composition is free or substantially free of wax, derivatives of wax, wax-like materials, for example, stearates, and other materials, which adhere to and resist removal from paper fibers.

The present invention thus provides a colored pencil lead composition comprising a colorant, one or more binder resins, a fibrillatable or fibrillated material, a non-fibrillatable particulate lubricant, and a filler. A detailed description of each of the components, a method of producing the colored pencil lead, and the advantageous properties of the colored pencil lead are set forth below.

The colored pencil lead composition contains a suitable colorant—pigment, dye, or combinations thereof. The pigment can be organic or inorganic. Pigments producing special visual effects, for example, pearlescent pigments, can be used. The pigment can be a dry pigment or it can be a dispersion in water, optionally stabilized with surfactants or resins or encapsulated in an organic binder such as a melamine/formaldehyde resin. Examples of pigments stabilized with surfactants include the SUNSPERSE™ brand dispersions, available from Sun Chemical Colors Group in Amelia, Ohio. Examples of resin stabilized pigment dispersions include the FLEXIVERSE™ dispersions which are aqueous based alkali stabilized acrylic dispersions, also available from Sun Chemical Colors Group. Examples of pigments encapsulated in organic binders include RENOL™ pigments which are pigments coated with polyvinyl butyral and available from Clariant Corp. in Charlotte, N.C.

Pigments dispersed in water and stabilized with surfactants are preferred for making the leads of the present invention. A predispersed pigment is relatively easier to incorporate with other ingredients and surfactant-stabilized dispersions generally produce better quality extrudates than resin-stabilized dispersions. It is believed that the resin may penetrate the paper and occupy the space between the fibers when the pencil lead is used to mark the paper, and consequently causes certain difficulty in erasing the mark.

The pigment can be present in the lead in any suitable amount. The preferred pigment level on a dry volume basis is from about 10% to about 30% of the lead composition, and a more preferred pigment level on a dry volume basis is from about 15% to about 20% of the lead composition.

The binder material provides integrity to the colored pencil lead by bonding the ingredients of the lead together. Any suitable binder material known to those of ordinary skill in the art can be used. The binder material can be thermoplastic polymers such as polyolefins, acrylics, styrenics, PVC, and plasticized PVC, with polyolefins being a preferred class of binder material. Examples of polyolefins include polyethylene and polypropylene. High density polyethylene (HDPE) is a preferred binder resin. A preferred HDPE resin is MICROTHENE™ FA 70000, which is a spherical powder available from Equistar Chemicals Inc. in Houston, Tex. The powder form of polyethylene is particularly preferred.

The binder material can be in the form of dry resins, latex or dispersions, or solutions. Examples of latex or dispersions include acrylic dispersions, copolymers of ethylene and acrylic acid (EAA), and copolymers of styrene and butadiene. The ratio of ethylene to acrylic acid is from about 1:10 to about 10:1, and preferably 1:1. Examples of polymer solutions include polystyrene dissolved in a solvent such as methyl ethyl ketone, and polyvinyl alcohol dissolved in water.

The binder resin also can be a thermoset. Examples of thermosetting polymers include unsaturated polyesters, vinyl esters, and epoxy resins.

The binder material can be used in any suitable amount. For example, the binder material can be present in an amount of from about 10% to about 60% of the lead composition on a dry volume basis, and preferably in an amount of from about 40% to about 50% of the lead composition on a dry volume basis.

It is particularly preferred that a combination of HDPE and EAA is used as the binder material. This combination provides good laydown and, as a result, the color intensity of the markings is excellent. An example of a suitable EAA is POLYEMULSION™ 540N30, which is 95% ethylene and 5% acrylic acid, available from Chemcor, in Chester, N.Y. The ratio of polyethylene to EAA can range from about 1:0 to about 0:1, and preferably from about 1:0.3 to about 1:0.05.

The colored pencil lead of the present invention can include any suitable filler. The role of the filler is to provide stiffness and strength to the lead. Examples of suitable fillers include talc, silica, calcium carbonate, mica, wollastonite, and clay. The fillers can have any suitable geometry. Plate-like fillers such as talcs and micas are particularly preferred for the reasons that they have a soft consistency and the particle edges can promote abrasion of the lead to provide smooth laydown. The fillers may optionally have a surface treatment to improve dispersibility and/or adhesion to the binder material. The particle size of the filler is from less than about 1 $\mu$m to about 50 $\mu$m, and preferably from about 10 $\mu$m to about 30 $\mu$m. The lead composition can contain the filler in any suitable amount, for example, in an amount of from about 10% to about 60%, and preferably from about 20% to about 40% on a dry volume basis of the lead composition.

Any suitable fibrillatable or fibrillated material can be employed to prepare the composition of the present invention. It has been found that the presence of small diameter fibrils, particularly, those having a diameter of from about 0.1 to about 5 $\mu$m, imparts erasability to the lead. Preferably, a fibrillatable or fibrillated polymer is employed. Fibrillatable polymers are those which form fibers when subjected to shear, for example, when subjected to extrusion. Examples of fibrillatable or fibrillated polymer includes polyolefins, preferably PTFE, polyethylene, and polypropylene. PTFE is a particularly preferred fibrillatable or fibrillated polymer. Examples of other fibrillatable or fibrillated polymer includes aliphatic and aromatic polyamides such as nylons and KEVLAR™, polyimides, and polyesters. The fibrils can be incorporated by starting with the material already in fibril form and dispersing them with the other ingredients, or producing them in situ by starting with a fibrillatable polymer, which could be in the form of a latex, suspension, or dry powder. An example of a preferred fibrillatable PTFE is the FLUON™ AD-1 emulsion available from ICI Fluoropolymers in Wilmington, Del. This emulsion is made of PTFE particles of 0.25 $\mu$m and contains 59–62% solids. The emulsion form allows easy blending of the PTFE with other ingredients of the lead composition.

The fibrillated or fibrillatable material can be used in any suitable amount. For example, it can be used in an amount of from about 0.4% to about 10% of the lead composition on a dry volume basis, and preferably in an amount of from about 1.5% to about 3% of the lead composition on a dry volume basis.

The colored pencil lead of the present invention contains a non-fibrillatable particulate lubricant. This material remains as a particulate during the melt extrusion or wet processing step. The lubricant improves the laydown property. In addition, the lubricant improves erasability because it does not adhere or minimally adheres to the paper fibers. Any suitable lubricant can be used. A preferred lubricant is micronized PTFE powder, which can be produced by grinding sintered PTFE to particles of size about 1 $\mu$m to about 20 $\mu$m. An example of a suitable micronized PTFE powder is SST-2 SP5™ available from Shamrock Technologies, Inc. in Newark, N.J. Micronized PTFE is particularly advantageous since it does not adhere to the paper fibers. Further, micronized PTFE is white and thus does not compromise the color quality of the colored pencil lead.

The non-fibrillatable particulate lubricant can be used in any suitable amount, for example, in an amount of from about 5% to about 50% of the lead composition on a dry volume basis, and preferably in an amount of from about 10% to about 30% of the lead composition on a dry volume basis. When the amount of the lubricant falls below 5% by volume of the lead composition, the lead tends to be too soft and to fray excessively at the tip.

The volume ratio of the non-fibrillatable particulate lubricant to the fibrillated or fibrillatable material can range from about 1:0.01 to about 1:1, and preferably from about 1:0.1 to about 1:0.4.

It has been found that the properties of the lead are readily correlated with the volume fraction of each component. For this reason, the amounts of the components have been expressed herein as volume fractions. Those desiring to substitute one or more components with materials having a different density, the volume fraction of that component (and all other components) should be maintained substantially the same as in the original formulation in order to produce a lead with equivalent properties.

The volume fraction can be converted to weight fraction using the following formula:

$$W_{fn} = (V_{fn}) \cdot (V_T) \cdot (D_n / W_T)$$

wherein $W_{fn}$ is the weight fraction, $V_{fn}$ is the volume fraction, and $D_n$ is the density of component n. $W_T$ is the total dry weight and $V_T$ is the total dry volume of the lead composition.

As discussed earlier, the colored pencil lead of the present invention has excellent laydown and erasability. The lead markings do not smudge during normal contact with objects, and they also do not smear when rubbed with an ordinary pencil eraser. The erasability, smudging, and smearing of the markings are further described below. The percentage of colored marking left unremoved on the substrate after the marking is rubbed a given number of times with an ordinary pencil eraser is described as the percent not erased. The amount of marking that extends to an adjacent unmarked area when the marking is rubbed with an ordinary pencil eraser is related to the smear of the marking. The amount of marking that extends to an adjacent unmarked area when the marking is rubbed with an object such as a rod or stump is related to the smudging of the marking.

The erasability, smudging, and smearing properties of a lead can be quantitatively measured by methods known to those skilled in the art, for example, by the use of a spectrophotometer. It is known that color applied to a surface can be defined in terms of a color in a color sphere. The color sphere is defined by the lightness ("L") value, the red/green ("a") value, and the blue/yellow ("b") value. See, for example, Color Measurements Instrument Manual, X-Rite® No. 948-968 (1990). Thus the three values when combined define a color of an object as seen by the human eye. Any given color can then be measured in terms of the "L.a.b." value and expressed in relation to the L.a.b. value of a known reference standard such as a white paper. The difference between the L.a.b. values of the substrate and the standard is expressed as the L.a.b. DE (or delta E) value. This method is generally known in the industry as an ellipsoidal tolerance method.

The amount of smudging can be determined as follows. The $DE_0$ value of a freshly applied marked is obtained and this value is then set to be equal to 100% color intensity. The marking is then rubbed using a stump under a given constantly applied pressure. The rubbing is extended in a controlled manner to an area outside the mark on the substrate. The amount of the mark transferred to the extended area is measured.

The amount of marking left unremoved after a marking is rubbed with an eraser can be measured as follows. The marking is rubbed with an eraser a given number of times under a given constantly applied pressure. The eraser is extended into the adjoining unmarked area. The L.a.b. DE value of the marking left unremoved is measured. The erasability of the marking is then expressed as the percent color remaining after the eraser rubs. The L.a.b. DE value of the extended area also is measured, and this value is correlated with the eraser smudging. The measurements of eraser smear, percent unerased, and the stump smudge rating are further illustrated in the Examples herein.

Thus, the colored pencil marking of the present invention has an eraser unerased mark (percent not erased) rating of about 15% or less; an eraser smear rating of about 30% or less; and/or a stump smudge rating of about 20% or less. The marking preferably has an eraser smear rating of less than about 20%, more preferably a smear rating of less than about 15%, and even more preferably a smear rating of less than about 10%. The marking preferably has a stump smudge rating of less than about 15%, more preferably a smudge rating of less than about 10%, even more preferably a smudge rating of less than about 6%, yet even more preferably a smudge rating of less than about 3%, and further more preferably a smudge rating of less than about 2%. The marking preferably has an unerased marking rating of less than about 12%, more preferably an unerased marking rating of less than about 10%, and even preferably an unerased marking rating of less than about 6%. The markings discussed herein are made under conditions that are typically observed during the normal use of colored pencils. Thus, the force (described herein in mass units for ease of understanding) applied to create the markings ranges from 300 g to 600 g. The marking is made at a rate of about 20 feet per minute to about 36 feet per minute with an average rate of about 29 feet per minute.

The erasing is performed by erasing with an ordinary pencil eraser, Eberhard Faber, PINK PEARL™ No. 100, under an applied force of 600 g; and the stump smudging is carried out under an applied force of 1200 g. The substrate is a white paper such as White Bond or White Tablet paper, which is a 15 Sub paper having a basis weight of 56.4 g/m², a TAPPI brightness standard rating of 82.0, a Sheffield smoothness standard rating of 300, and an opacity standard rating of 78.

The present invention further provides a process for preparing the colored pencil lead composition of the present invention comprising compounding the colorant, the binder resin or resins, the fibrillatable or fibrillated material, the non-fibrillatable particulate lubricant, and the filler, to obtain a blend and forming the pencil lead from the blend.

The blend of the ingredients can be prepared by any method known to those of ordinary skill in the art. Thus, the compounding can be performed by dry blending, semi-dry blending, or wet blending of the ingredients.

In dry blending, all the ingredients are in a dry state, preferably in powder form. All of the ingredients are charged into a powder blending device such as a v-blender or any other suitable mixer. The powders are blended together to obtain intimate mixing of the ingredients. The mixed powder is then used for manufacturing leads.

In semi-dry blending, a small quantity of water is used in the blending step in order to produce a blend that is in the form of a heavy paste. Water can be added to a dry blend of the powders or alternatively, water can be included along with one or more of the ingredients. For example, the binder resin can be in the form of a dispersion in water such as a dispersion of ethylene-acrylic acid having 30% solids content by weight, a pigment dispersion having a solids content of 55% by weight, or a dispersion of fibrillatable polymer in water such as an aqueous dispersion of fibrillatable PTFE having a solids content of 60% by volume.

Thus, in semi-dry blending, all of the dry ingredients are blended to obtain a homogeneous mixture and then the required amount of water is added to obtain a heavy paste. This paste is either extruded into leads or extruded to form strands which are then pelletized. The pellets are then dried to remove the water, preferably at an elevated temperature to speed up the drying process. The pellets are then used for extrusion of leads.

In wet blending, the blend is in the form of a viscous liquid having the consistency of paint. Wet blending is carried out on dispersing equipment typically used for dispersing solids in liquids such as those used in the preparation of paints, for example, vertical or horizontal mixers and ball or pebble mills.

The wet blending can be performed as follows. The pigment dispersion is charged into a suitable container and the dispersion is mixed at a high speed with a high speed disperser. If necessary, water is added to reduce the viscosity of the dispersion. The binder resins which may be in the form of powder or dispersion, filler, and the non-fibrillatable particulate lubricant are added and the mixing is continued for about 20 minutes. The fibrillatable material, preferably in the form of a dispersion, is then added. The mixing is continued until a smooth blend is obtained. The blend is then dried by any known drying processes, for example, in open trays preferably at an elevated temperature or by spray drying.

The blend prepared as above can be formed into leads by methods known to those of ordinary skill in the art, for example, by melt processing, wet processing, or reactive processing. For methods of plastics processing, see generally, *Kirk-Othmer Encyclopedia of Chemical Technolog*, 19, pp. 290–316, $4^{th}$ ed. (1996). In melt processing, the blend is dry while wet processing requires that the blend is a heavy paste. Reactive processing utilizes reactive binders such as epoxy or unsaturated curable resins such as unsaturated polyester resins.

In melt processing, for example, the leads can be formed by extrusion, compression molding, or calendaring. In extrusion, the blend in dry form is charged into an extruder such as a single or twin screw extruder and extruded through a die to form a strand. The die can be of suitable cross-section, circular, square, or any desired cross-section. The strand is cooled to room temperature and then cut into the appropriate length to obtain leads.

If the extruder feed material is in the form of a powder the extruder should be equipped with a device in assisting in the feeding of the powder, for example, an auger feeder. The extrusion can be carried out in one step or in two steps. When it is carried out in two steps, a primary extrusion is carried out first to accomplish good mixing and to produce the material in pellet form. The second extrusion is carried out on the pellets to produce the leads.

Compression molding processes use a hydraulically operated press with platens to form the desired part, herein lead, in matching metal molds and to hold the densified molding material in desired shape until the system is cured or cooled sufficiently to permit part removal. Thus, the dry blend is charged into a compression mold which is then heated to soften or melt the binder. The molten material is forced into the grooves of the shape of pencil leads. The leads are removed after cooling.

Calendering is a process employed to produce plastic sheets. See, for example, *Kirk-Othmer Encyclopedia of Chemical Technology*, 19, 309, $4^{th}$ ed. (1996). A calendar typically has four heavy, large steel rolls, which are usually assembled in an inverted L configuration. The dry blend is fed to the rolls and calendered to obtain a sheet. The sheet is then slit to form rectangular or square cross-section.

The blends prepared by the wet blending can be processed into leads by extrusion, compression molding, or calendering. In extrusion, the wet mix is fed into an extruder and extruded, at room temperature or at an elevated temperature but preferably below the boiling point of water, through a suitable orifice. The lead formed by this process is cut to the appropriate length and dried. After the drying is complete, the temperature of the leads may be increased to melt the binder and improve the strength of the lead.

In compression molding, the wet mix is charged into a compression mold with matched grooves with the shape representing that of the lead. The platens are closed to compress the mix into the desired lead shape. The platens are opened and the leads removed and dried. After the drying is complete, the temperature of the leads may be increased to melt the binder and improve the strength of the lead.

In calendering, the wet mix is calendered between a stack of rolls to form a sheet. The sheet is then slit to for leads with rectangular or square cross-section.

In reactive processing of the blend, the blend is processed in a manner similar to wet processing except that the lead has to be heated either during or after extrusion to cause the reactive binder to solidify.

Colored lead pencils of the present invention can be fabricated using methods known to those of ordinary skill in the art. For example, the colored pencil lead and the pencil casing can be coextruded; or the colored pencil lead, the casing, and any other outer coating can be coextruded to obtain the colored lead pencil. Alternatively, the colored pencil lead can be assembled by combining a lead and a prefabricated casing. For example, the two halves of a prefabricated casing can be pressed together with the pencil lead to obtain the colored pencil. The casing can be made of any material known to those skilled in the art including wood and plastic materials.

The following illustrative examples further illustrate the present invention but, of course, should not be construed as in any way limiting its scope.

EXAMPLE 1

This Example illustrates the preparation of a colored pencil lead. The ingredients used are set forth herein below. The lead was produced as follows.

The required amount of the pigment dispersion was weighed into a mixing container and the mixer was started. The polyethylene powder was added with mixing. The required amount of talc was then added. A small amount of water was added to reduce the viscosity of the mixture. Micronized PTFE, average particle size 4 $\mu$m, was then added. The fibrillatable PTFE emulsion and the ethylene acrylic acid emulsion were then added. The resulting paste was poured into a drying pan and allowed to dry overnight at 110° C. in an oven. The trays were removed from the oven and allowed to cool to room temperature. The material was removed from the pan and ground to a powder in a blender. The ground material was sorted through a #10 mesh sieve. The powder was then extruded in a ¾ inch, L/D=24/1 extruder (compression ratio of 1.5:1) under the following conditions: die diameter 3 mm; temperature profile: 160° C. (zone 1, feed side), 180° C. (zone 2), 180° C. (zone 3, die side) and 180° C. (die). The screw was operated at 60 RPM.

| Ingredients | Wt. % | Vol. % |
|---|---|---|
| SUNSPERSE RHD 6011 (organic red pigment) | 13.2 | 16.5 |
| FLUO HT (micronized PTFE, Micro Powders, Inc. Tarrytown, New York) | 20.8 | 16.8 |
| FLUON AD-1 (fibrillatable PTFE) | 3.6 | 3.0 |
| HDPE FA 700 (high density polyethylene powder) | 17.9 | 33.5 |
| POLYEMULSION 540N30 (ethylene-acrylic acid copolymer) | 1.5 | 2.9 |
| MICROTUFF AG 609 (surface treated talc, Barretts Minerals Inc., South of Dillon, Montana) | 43.0 | 27.3 |
| Total | 100.0 | 100.0 |

The colored pencil lead thus produced made marks with good color intensity and good erasability.

EXAMPLE 2

This Example illustrates the preparation of another embodiment of the colored pencil lead of the present invention. Colored pencil leads were produced following the procedure illustrated in Example 1 except that the relative amounts of the micronized PTFE and fibrillatable PTFE were changed. The amounts of the ingredients are set forth herein below.

| Ingredients | Wt. % | Vol. % |
|---|---|---|
| SUNSPERSE RHD 6011 (organic red pigment) | 13.2 | 16.5 |
| FLUO HT (micronized PTFE) | 12.2 | 9.9 |
| FLUON AD-1 (fibrillatable PTFE) | 12.2 | 9.9 |
| HDPE FA 700 (high density polyethylene powder) | 17.9 | 33.5 |
| POLYEMULSION 540N30 (ethylene-acrylic acid copolymer) | 1.5 | 2.9 |
| MICROTUFF AG 609 (surface treated talc) | 43.0 | 27.3 |
| Total | 100.0 | 100.0 |

The leads produced marks of medium color intensity and good erasability.

EXAMPLE 3

This Example illustrates the preparation of another embodiment of the colored pencil lead of the present invention. Colored pencil leads were produced following the procedure illustrated in Example 1 except that the micronized PTFE particles had a size of 12–20 µm. The composition had a lower level of surface treated talc. The amounts of the ingredients are set forth herein below.

| Ingredients | Wt. % | Vol. % |
|---|---|---|
| SUNSPERSE RHD 6011 (organic red pigment) | 13.2 | 16.5 |
| SST-2-SP5 (micronized PTFE) | 20.8 | 16.8 |
| FLUON AD-1 (fibrillatable PTFE) | 3.6 | 3.0 |
| HDPE FA 700 (high density polyethylene powder) | 17.9 | 33.5 |
| POLYEMULSION 540N30 (ethylene-acrylic acid copolymer) | 1.5 | 2.9 |
| MICROTUFF AG 609 (surface treated talc) | 43.0 | 27.3 |
| Total | 100.0 | 100.0 |

The leads produced marks with increased color intensity and erasability.

EXAMPLE 4

This Example illustrates the preparation of another embodiment of the colored pencil lead of the present invention. Colored pencil leads were produced following the procedure illustrated in Example 1 except that red iron oxide pigment was used instead of the organic red pigment. Surface treated mica was used instead of surface treated talc. The ethylene acrylic acid emulsion was omitted. The amounts of the ingredients used are set forth herein below.

| Ingredients | Wt. % | Vol. % |
|---|---|---|
| C888-1045F (red iron oxide pigment, Creanova, Inc., Somerset, New Jersey) | 53.5 | 19.8 |
| FLUO HT (micronized PTFE) | 24.0 | 20.2 |
| FLUON AD-1 (fibrillatable PTFE) | 4.2 | 3.5 |
| HDPE FA 700 (high density polyethylene powder) | 22.3 | 43.5 |
| Total | 100.0 | 100.0 |

The leads produced marks with good color intensity and erasability.

EXAMPLE 5

This Example illustrates the preparation of another embodiment of the colored pencil lead of the present invention. Colored pencil leads were produced following the procedure illustrated in Example 1 except that the composition included a low density polyethylene, an ethylene-vinylacetate (EVA) copolymer, and an ethylene-acrylic acid copolymer. The amounts of the ingredients are set forth herein below.

| Ingredients | Wt. % | Vol. % |
|---|---|---|
| SUNSPERSE RHD 6011 (organic red pigment) | 10.9 | 13.5 |
| FLUO HT (micronized PTFE) | 21.0 | 16.8 |
| FLUON AD-1 (fibrillatable PTFE) | 3.8 | 3.0 |
| MICROTHENE FN 51000 (low density polyethylene powder, Equistar Chemicals) | 12.3 | 23.5 |
| MICROTHENE FE 53200 (ethylene-vinylacetate copolymer) | 5.4 | 10.0 |
| POLYEMULSION 540N30 (ethylene-acrylic acid copolymer) | 1.5 | 2.9 |
| SILWAX WS (polydimethylsiloxane copolymer, Siltech Corp., Toronto, Canada) | 1.7 | 3.0 |
| MICROTUFF AG 609 (surface treated talc) | 43.4 | 27.3 |
| Total | 100.0 | 100.0 |

The leads produced marks of good color intensity and erasability.

EXAMPLE 6

This Example illustrates the preparation of another embodiment of the colored pencil lead of the present invention. Colored pencil leads were produced following the procedure illustrated in Example 1 except that the composition included a polypropylene and an EVA copolymer. The amounts of the ingredients are set forth herein below.

| Ingredients | Wt. % | Vol. % |
|---|---|---|
| SUNSPERSE RHD 6011 (organic red pigment) | 13.8 | 15.2 |
| FLUO HT (micronized PTFE) | 21.7 | 15.4 |
| FLUON AD-1 (fibrillatable PTFE) | 1.4 | 1.0 |
| MICROTHENE FP 80000 (polypropylene) | 19.5 | 33.5 |
| MICROTHENE MU 76000 (EVA) | 5.1 | 8.4 |
| PEG 20M (polyethyleneglycol 20,000 MW, Union Carbide Corp., Danbury, Connecticut) | 3.8 | 5.3 |
| SILWAX WD-F (polydimethylsiloxane wax, | 1.8 | 2.9 |

-continued

| Ingredients | Wt. % | Vol. % |
|---|---|---|
| Siltech Corp.) | | |
| MICROTUFF AG 609 (Surface treated talc) | 32.9 | 18.4 |
| Total | 100.0 | 100.0 |

The leads produced marks of good color intensity and erasability.

EXAMPLE 7

This Example illustrates the preparation of another embodiment of the colored pencil lead of the present invention. Colored pencil leads were produced following the procedure illustrated in Example 1 except that the composition included a polypropylene and an EVA copolymer as binder resins, and silica as a filler. The amounts of the ingredients are set forth herein below.

| Ingredients | Wt. % | Vol. % |
|---|---|---|
| SUNSPERSE RHD 6011 (organic red pigment) | 13.6 | 15.4 |
| FLUO HT (micronized PTFE) | 21.5 | 15.7 |
| FLUON AD-1 (fibrillatable PTFE) | 1.9 | 1.4 |
| MICROTHENE FP 80000 (polypropylene) | 16.7 | 29.6 |
| MICROTHENE MU 76000 (EVA) | 5.0 | 8.6 |
| PEG 20M (polyethyleneglycol 20,000 MW) | 3.7 | 5.4 |
| SILWAX WD-F (polydimethylsiloxane wax, Siltech) | 1.8 | 2.9 |
| SYLOID 74 (Silica from Grace-Davison) | 3.1 | 2.5 |
| MICROTUFF AG 609 (Surface treated talc) | 32.5 | 18.6 |
| Total | 100.0 | 100.0 |

The leads produced marks of good color intensity and erasability.

EXAMPLE 8

This Example illustrates a method of measuring the pressure or force with which a marking is made during the normal use of the colored pencils by test subjects including children and adults. This Example further illustrates the measurement of writing angle and writing speed.

The apparatus used to measure the marking pressure comprised a school desk, a load cell, a strip chart recorder, and the necessary load cell control electronics. Thus, a school desk was modified to have an opening on the top of the desk. A 25 lbs capacity load cell from Omega Engineering was placed under the desk opening so that the pressure sensitive face of the load cell was flush with the top of the desk. The load cell was connected to the strip chart recorder and fitted with appropriate power supply and control electronics. The apparatus was built so that the load cell was hidden from the view of the test subjects in order to eliminate any bias.

A preprinted object, such as a hot air balloon, was removably fixed on the face of the load cell and the test subjects were asked to color the object. The average and the maximum force used during marking was calculated from the strip chart recordings. It was found that the average force applied was 300 grams and the maximum force applied was 600 grams.

A protractor, such as by Skill Tech, or by Mitutoyo/MTI, Model 180-905, Aurora, Ill., was used to measure the writing angle. The average angle of writing was 53 degrees. It was observed that the writing angle did not significantly affect the laydown of the markings. Further, a stop watch was used to determine the speed of writing. The speed of writing was calculated from the time it takes to cover a known distance between given points of the object, for example, the distance between the lines of the hot air balloon. It was found that the writing speed was from about 20 feet per minute to about 36 feet per minute with an average at 28 feet per minute.

EXAMPLE 9

This Example illustrates a method of producing colored pencil markings under controlled conditions that simulate actual markings made by the test subjects under normal marking conditions. Such simulated markings can be used reproducibly to evaluate the properties of the colored pencil lead including laydown, smudge, smear and erasability of the marking.

A Contecma Writeout Machine Model 611 by Contecma Precision Machinery for Writing Instruments, Contecma SA, P.O. Box/Via agli Orti 20, Viganello-Lugano, Switzerland, normally used for evaluating writing instruments such as felt tipped markers and ball point pens, was used to produce markings of colored pencil leads. A clinometer, Model ANGLE FINDER™ available from Dasco Pro Inc. in Rockford, Ill., was used to measure and adjust the writing angle.

Prior to making each writeout or rubout, the pencils were sharpened using an electric pencil sharpener, which was either a Hunt Boston model, Hunt Manufacturing Co. in Statesville, N.C., or a Panasonic Model KP-33, Matsushita Electric Industrial Co. Ltd., Japan. The pencils were sharpened to a taper angle of about 10–12° (about 5–6° with respect to the longitudinal axis of the pencil), and the cross-sections of the tips were made flat using a jig plate and a file. The jig plate, which is a rectangular stainless steel plate, had a thickness of 0.118 inch and a hole of diameter 0.078 inch. The sharpened pencil tip was placed in the hole and the portion of the pencil lead tip extending out of the hole was removed using a metal file to obtain a pencil with a tip having flat cross-section. This insured to reduce or eliminate any variations in pencil sharpening and to provide a uniform tip diameter at the start of each rubout.

A colored lead pencil was placed in the writing instrument sample holder of the writeout machine. The pencil was held in the vertical position, the verticality being insured by the use of the clinometer, with the writing tip pointing to the paper. Weight pieces totaling to 300 g or 600 g were placed in the pencil holding tube located within the sample holder. The total weight of the weight pieces employed corresponds to the force applied in creating the rubout.

The writeout machine employed rolled paper, although other types such as sheets also can be used by attaching sheet paper with tape. The machine was programmed at the "zigzag" setting to write at a speed of 36 feet per minute in a zigzag manner to create a uniformly colored solid pattern of 30 mm width. At these chosen speeds of paper feed and writing, the colored pencil wrote in a zigzag manner to produce a solid pattern without leaving blank spots. Six rubouts, each 25 feet long, were made from a given colored pencil. The pencil was sharpened and the tip flattened as discussed above prior to the beginning of each rubout run.

EXAMPLE 10

This Example illustrates a method of evaluating the colored pencil leads for smearing, smudging and erasability of the mark.

The L.a.b. values of the rubouts were measured on an X-RITE SP68™ Sphere Spectrophotometer available from X-Rite Inc. in Granville, Mich., using the QA MASTER™ software. The spectrophotometer employed a 10 mm reading head. DE values of the rubouts relative to a white area were obtained from the measured L.a.b. values. The DE value of the unerased rubout was obtained by measuring L.a.b. values at three spots along the width, and the measurements were made at the initial 10 mm length of the rubout. Three such readings were taken on each of the six rubouts and the average of the 18 DE values obtained was taken as $DE_0$, a measure of the laydown of the colored pencil lead.

The rubouts were subjected to rubbing with an eraser to measure the smearing characteristic. A PINK PEARL No. 100 pencil eraser was used to erase the rubout. A constant force of 600 g, as measured on the load cell discussed in Example 8, was applied to erase the rubout. The rubout was erased only a distance equal to one-half its width. As indicated, the width of the rubout was 30 mm. Thus, the rubout was erased to a width of 15 mm. The erased area was a rectangular area, 15 mm long in one direction and 10–20 mm long in the other direction. The eraser stroke started from the midpoint of the rubout measured along the width and continuously extended 15 mm past the edge into the unmarked white area. The eraser was moved in a zigzag fashion, and for each eraser test, 24–36 hand strokes were employed, each stroke involving one forward movement and one backward movement. The eraser crumbs were brushed off after every 6–12 strokes. The L.a.b. values of the erased areas and the extended areas also were measured relative to the white area, and DE values were calculated. An average DE value of at least two erasure tests was obtained. The amount of the rubout not erased and the amount of the rubout smeared into the white area were calculated as follows:

Percent of rubout not removed by the eraser=$(DE_1/DE_0) \times 100$, wherein $DE_1$ is the DE value of the erased area.

Percent eraser smear=$(DE_2/DE_0) \times 100$, wherein $DE_2$ is the DE value at the extended area.

The rubouts prepared as in Example 9 were subjected to a stump smudge test as follows. The tip of a Blending Stump (#8), Product No. 8948, supplied by Art & Drafting Connection in Bethlehem, Pa., which is similar to stumps generally used by artists for blending pastels and pastel type media, was employed to smudge the rubouts. The stump tip had an angle of 15 degrees with respect to the longitudinal axis. A constant pressure of 1200 g, as measured by a load cell, was applied to force the rubout from its midpoint across the width and extending 15 mm into the white area. The tip was sharpened using a 320 grip sand paper when the formulation of the colored pencil changed.

The L.a.b. values of the forced areas and the extended areas also were measured relative to the white area, and the DE values were calculated. An average DE value of at least three such smudge tests was obtained. The smudging was expressed as follows:

Percent smudge=$(DE_3/DE_0) \times 100$, wherein $DE_3$ is the DE value at the extended area.

EXAMPLE 11

This Example illustrates some of the properties of the colored pencil. The eraser smear, percent unerased, and the percent stump smudge illustrated in Example 10 are set forth below along with corresponding data for a commercially available non-erasable colored pencil. The advantages of the colored pencil of the present invention are readily apparent from the data set forth below.

| Formulation of Example No. | Rubout Application Load, Grams | Percent Eraser Smear | Percent Not Erased | Percent Smudge |
| --- | --- | --- | --- | --- |
| 1 | 600 | 18.9 | 10.0 | 2.5 |
| 1 | 300 | 18.7 | 10.4 | 5.6 |
| 6 | 600 | 9.2 | 7.7 | 2.1 |
| 6 | 300 | 16.1 | 6.0 | 2.2 |
| 5 | 600 | 12.9 | 9.1 | 0.8 |
| 5 | 300 | 20.4 | 6.6 | 2.4 |
| 7 | 600 | 11.0 | 12.0 | 2.0 |
| Non-erasable colored pencil | 600 | 45 | 59 | 23 |

In addition to being useful for making colored pencil leads, the composition of the present invention may also be made into other useful articles such as refills for mechanical pencils, free standing pencils, crayons and the like, and paints, and marking systems including those with a marker delivery device.

All references, including patents and publications, cited herein are hereby incorporated in their entirety by reference.

While this invention has been described with an emphasis upon several embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. A colored pencil lead composition which is substantially free of low melting wax comprising a colorant, one or more binder resins, a fibrillatable or fibrillated material, a non-fibrillatableparticulate lubricant, and a filler.

2. The colored pencil lead composition of claim 1, wherein said fibrillatable or fibrillated material is a fibrillatable or fibrillated polymer.

3. The colored pencil lead composition of claim 2, wherein said non-fibrillatable particulate lubricant is a non-fibrillatable particulate polymer.

4. The colored pencil lead composition of claim 3, wherein said non-fibrillatable particulate polymer is polytetrafluoroethylene.

5. The colored pencil lead composition of claim 4, wherein said colorant is a pigment.

6. The colored pencil lead composition of claim 5, wherein said fibrillatable or fibrillated polymer is polytetrafluoroethylene.

7. The colored pencil lead composition of claim 6, wherein said binder resin is selected from the group consisting of thermoplastic polymers, thermosetting polymers, and latex polymers.

8. The colored pencil lead composition of claim 6, wherein said composition includes olefin homopolymer and an olefin copolymer as binder resins.

9. The colored pencil lead composition of claim 8, wherein said olefin homopolymer is selected from the group consisting of polypropylene and high density polyethylene and said olefin copolymer is an ethylene-acrylic acid copolymer.

10. The colored pencil lead composition of claim 6, wherein said non-fibrillatable polymer and said fibrillatable or fibrillated polymer are present in the composition in an amount of from about 1:0.01 to about 1:1.

11. The colored pencil lead composition of claim 10, wherein said filler is selected from the group consisting of mica, talc, silica, clay, and calcium carbonate.

12. The colored pencil lead composition of claim 10, wherein said pigment is present in an amount of from about 10% by volume to about 30% by volume of the composition, said binder resin or resins are present in an amount of from about 30% by volume to about 50% by volume of the composition, said fibrillatable or fibrillated polymer is present in an amount of from about 2% by volume to about 10% by volume, said non-fibrillatable particulate polymer is present in an amount of from about 10% by volume to about 30% by volume of the composition, and said filler is present in an amount of from about 10% by volume to about 30% by volume of the composition.

13. The colored pencil lead composition of claim 7, wherein said binder resin is an thermoplastic polymer.

14. The colored pencil lead composition of claim 13, wherein said thermoplastic polymer is a polyolefin.

15. A process for preparing a colored pencil lead which is substantially free of low melting wax comprising a colorant, one or more binder resins, a fibrillatable or fibrillated material, a non-fibrillatableparticulate lubricant, and a filler, said process comprising blending said colorant, said binder resin or resins, said fibrillatable or fibrillated material, said non-fibrillatableparticulate lubricant, and said filler to obtain a blend and forming said pencil lead from said blend.

16. The process of claim 15, wherein said blending is carried out as a dry blending process, semi-dry blending process, or a wet blending process.

17. The process of claim 15, wherein said pencil lead is formed by processing the blend in a melt process, wet process, or reactive process.

18. The process of claim 15, wherein said fibrillatable or fibrillated material is a fibrillatable or fibrillated polymer.

19. The process of claim 15, wherein said non-fibrillatable particulate lubricant is a non-fibrillatable particulate polymer.

20. The process of claim 19, wherein said non-fibrillatable particulate polymer is polytetrafluoroethylene.

21. A colored pencil lead composition comprising a colorant, at least one binder resin, a fibrillated or fibrillatable material, a non-fibrillatable particulate lubricant, and filler, wherein said lead composition is capable of producing on White Bond paper a second mark having a not erased rating of about 15% or less, wherein said second mark is formed by erasing a first mark produced on said paper under a constant applied force in the range of 300–600 g with an ordinary pencil eraser applied to said first mark under a constant applied force of 600 g.

22. The colored pencil lead composition of claim 21, wherein a third mark is formed by erasing said second mark, said third mark having an eraser smear rating of about 30% or less wherein the eraser was extended outside said first mark on the paper to a distance equal to the distance erased on said first mark to create said third mark.

23. The colored pencil lead composition of claim 21, wherein said first mark has a blending stump smudging rate of about 20% or less, wherein said stump was used to rub said first mark under a constant applied force of 1200 g and the stump was extended outside said first mark on the paper to a distance equal to the distance rubbed on the mark.

* * * * *

UNITED STATES PATENT AND TRADEMARK OFFICE
CERTIFICATE OF CORRECTION

PATENT NO. : 6,011,084
DATED : January 4, 2000
INVENTOR(S) : Jacob Leidner et al.

It is certified that error appears in the above-identified patent and that said Letters Patent is hereby corrected as shown below:

On the Title Page:

Second Column of Foreign References, line 15: "27929320" should read --2729320--.

Second Column of Foreign References, line 37: Reference "3530803 03/1987 Germany" should be inserted.

Column 1, line 67: "Thus" should begin a new paragraph.

Column 6, line 56: "v-blender" should read --V-blender--.

Column 14, line 37 (claim 1): "non-fibrillatableparticulate" should read "non-fibrillatable particulate".

Column 15, line 23 and line 26 (claim 15): "non-fibrillatableparticulate" should read "non-fibrillatable particulate".

Signed and Sealed this

Ninth Day of January, 2001

*Attest:*

*Attesting Officer*

Q. TODD DICKINSON
*Commissioner of Patents and Trademarks*